(Model.)
T. O. HINES.
BEEHIVE.
No. 507,070. Patented Oct. 17, 1893.
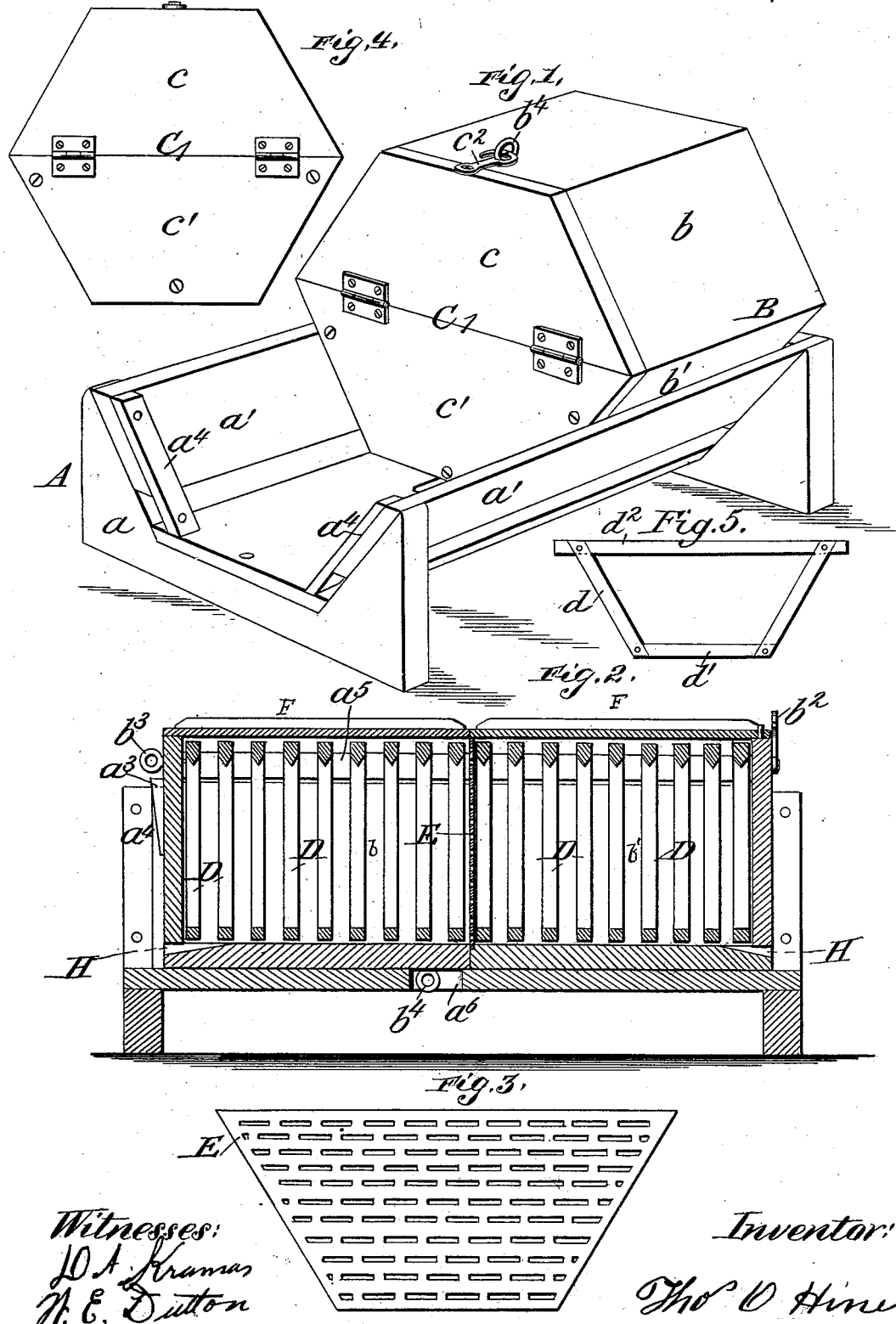
Witnesses:
J. A. Kramer
N. E. Dutton
Inventor:
Thos. O. Hines

UNITED STATES PATENT OFFICE.

THOMAS O. HINES, OF JACKSON, IOWA.

BEEHIVE.

SPECIFICATION forming part of Letters Patent No. 507,070, dated October 17, 1893.

Application filed May 19, 1891. Serial No. 393,361. (Model.)

*To all whom it may concern:*

Be it known that I, THOMAS O. HINES, a citizen of the United States, residing in Jackson township, in the county of Jones and State of Iowa, have invented certain new and useful Improvements in Beehives; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates generally to bee hives and more particularly to one in which the hive will be well adapted for keeping the bees protected in the winter season and may be enlarged to provide greatly increased space for honey making during the summer season. This object I accomplish in the manner and by the means hereinafter fully pointed out and definitely set forth in the claims, reference being had to the accompanying drawings, in which—

Figure 1 is a perspective view of my improved hive and its support, fixed for winter use. Fig. 2 is a central longitudinal section of the hive arranged for summer use. Fig. 3 is a detail view of the queen-bee excluder. Fig. 4 is a detail view of the end piece. Fig. 5 is a detail view of one of the comb frames.

Similar letters of reference indicate corresponding parts in the several views.

In the said drawings the letter A denotes a trough shaped hive support, open at each end, and comprising the end pieces $a$, and the sides $a'$. A hive B is adapted to rest in the support A, said hive consisting of two sections $b$, $b'$, having bottoms, sides, and one end each, said sections being so shaped that when superimposed one upon the other, with their open tops registering, they form a hexagonal prism open at one end. A hook $b^2$, engaging with an eye $b^3$, serves to hold the two sections together on one side, while a hexagonal shaped end piece C performs a similar function on the other side. The main function of the latter, however, is to close the open end of the hive, as shown in Fig. 1. This end piece is divided into two sections $c, c'$, hinged together, the lower half $c'$ being screwed to the corresponding part of the hive, while the upper section $c$ is fastened by the hook $c^2$ engaging the eye $b^4$ on the upper section $b$.

The foregoing is the construction of the hive during the winter months, which as will readily be seen, affords a practically perfect protection to the bees.

In order to afford better protection to the bees during cold weather, I place between the two sections of the hive a burlap cloth cover, on top of which, to the depth of about four inches, I place a packing of chaff, saw-dust, or any other substance capable of absorbing moisture, thus keeping the hive dry and free from ice during the winter. Ready access may be had to the packing through the hinged section of the end piece C.

During the summer season the end piece C is removed, and the top section $b$ placed alongside of the lower section $b'$ in the support A, with their open ends adjoining, being held in close contact with each other by means of wedges $a^3$ driven between them and the end strips $a^4$ on the support A.

A series of frames D are provided, of a shape corresponding with that of the hive sections, that is to say with their side bars $d$ converging at their lower ends and connected to the bottom piece $d'$ as shown in Fig. 5, so that the said side bars will directly receive and support the weight of the comb, thereby dispensing with the use of strengthening wires heretofore generally employed. These frames are supported in the hive section from the longitudinal strips $a^5$, upon which the projecting ends of the top bars $d^2$ of the frames rest.

During the summer season both sections of the hive have an equal number of frames D arranged therein, and all are properly spaced, but when the hive is to be closed for the winter all the frames in the section $b$ are removed, the honey extracted, and the frames, with their empty combs intact, stowed away to be used again the following summer.

During the summer season I locate between the sections of the hive a queen-bee excluding board E, shown in detail in Fig. 3, having a number of apertures therein large enough to permit the passage of the working bees, but too small for the queen-bee thus making section $b'$ the brood section. This effectually prevents the queen-bee from extending the brood comb into section $b$, thereby securing comb honey free from brood.

The top of the hive sections are completely closed during the summer season by means of boards F located thereon as shown in Fig. 2, though if desired a case of sections may be placed upon the section $b'$ in order to provide still more room for the bees, and also to obtain comb honey to sell as such.

Slots or apertures H in the ends of the hive sections afford in summer ready ingress and egress for the bees, and also act as ventilators during the hot weather.

A slot $a^6$ in the bottom of the support A receives the eye $b^4$ when the section $b$ is in the position shown in Fig. 2.

Having thus described my invention, what I claim is—

1. The combination with two similar and separable sections of a hive, each open at one end and placed with their open ends together, a support carrying the same, and a suitable cover for the sections, substantially as described.

2. The combination with two similar and separable sections of a hive, each open at one end and placed with their open ends together, a queen excluding board arranged between said sections, and a suitable cover for the sections, substantially as described.

3. The combination with two similar and separable sections of a hive, each open at one end and at the top, and placed one upon the other with their open tops together, of a hinged end board adapted to be fastened to said sections when arranged as set forth to close their open ends, substantially as described.

4. A bee hive consisting of two sections having inclined sides adapted to rest in a similar shaped support, a queen excluding board between the sections, a cover for the sections, and a series of comb holding frames having inclined sides to conform to the configuration of the sections, substantially as described.

In testimony that I claim the foregoing I have hereunto set my hand this 14th day of March, 1891.

THOS. O. HINES.

Witnesses:
A. W. HAY,
H. F. KEELER.